(12) United States Patent
Kohler et al.

(10) Patent No.: US 10,127,725 B2
(45) Date of Patent: Nov. 13, 2018

(54) AUGMENTED-REALITY IMAGING

(71) Applicant: MICROSOFT TECHNOLOGY LICENSING, LLC, Redmond, WA (US)

(72) Inventors: Jeffrey Kohler, Redmond, WA (US); Denis Demandolx, Bellevue, WA (US); Will Guyman, Medina, WA (US); Ashraf Ayman Michail, Kirkland, WA (US); Minshik Park, Kirkland, WA (US); Justin Nafziger, Seattle, WA (US); Eric Richards, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 14 days.

(21) Appl. No.: 14/843,709

(22) Filed: Sep. 2, 2015

(65) Prior Publication Data
US 2017/0061693 A1 Mar. 2, 2017

(51) Int. Cl.
*G06T 19/00* (2011.01)
*G06F 3/01* (2006.01)

(52) U.S. Cl.
CPC ............ *G06T 19/006* (2013.01); *G06T 19/00* (2013.01); *G06F 3/011* (2013.01); *G06F 3/012* (2013.01)

(58) Field of Classification Search
CPC ..... G06T 19/006; G06T 19/00; G02B 27/017; G06F 3/012
See application file for complete search history.

(56) References Cited

U.S. PATENT DOCUMENTS

| 7,804,507 | B2 | 9/2010 | Yang et al. | |
| 8,040,361 | B2 | 10/2011 | Bachelder et al. | |
| 8,400,548 | B2 | 3/2013 | Bilbrey et al. | |
| 8,477,149 | B2 | 7/2013 | Beato et al. | |
| 8,487,838 | B2 | 7/2013 | Lewis et al. | |
| 8,547,401 | B2 | 10/2013 | Mallinson et al. | |
| 8,576,276 | B2 | 11/2013 | Bar-Zeev et al. | |
| 8,633,946 | B2 | 1/2014 | Cohen | |
| 8,678,282 | B1 | 3/2014 | Black et al. | |
| 9,240,069 | B1* | 1/2016 | Li | G06T 15/00 |
| 2004/0119723 | A1* | 6/2004 | Inoue | G06T 15/10 |
| | | | | 345/619 |
| 2010/0182340 | A1 | 7/2010 | Bachelder et al. | |
| 2011/0231162 | A1* | 9/2011 | Ramamurthi | A61B 6/505 |
| | | | | 703/1 |

(Continued)

OTHER PUBLICATIONS

Szalavari, Z. et al., ""Studierstube": An Environment for Collaboration in Augmented Reality," Virtual Reality, vol. 3, No. 1, Mar. 1998, 15 pages.

(Continued)

*Primary Examiner* — Tapas Mazumder
(74) *Attorney, Agent, or Firm* — Alleman Hall Creasman & Tuttle LLP

(57) ABSTRACT

A two-dimensional augmentation image is rendered from a three-dimensional model from a first virtual perspective. A transformation is applied to the augmentation image to yield an updated two-dimensional augmentation image that approximates a second virtual perspective of the three-dimensional model without additional rendering from the three-dimensional model.

19 Claims, 8 Drawing Sheets

(56) References Cited

U.S. PATENT DOCUMENTS

| | | | |
|---|---|---|---|
| 2011/0254860 A1 | 10/2011 | Zontrop et al. | |
| 2012/0077582 A1 | 3/2012 | Noge | |
| 2012/0113223 A1 | 5/2012 | Hilliges et al. | |
| 2012/0142415 A1 | 6/2012 | Lindsay | |
| 2012/0188256 A1 | 7/2012 | Lee et al. | |
| 2013/0128364 A1 | 5/2013 | Wheeler et al. | |
| 2013/0147687 A1* | 6/2013 | Small | G09G 5/00 345/8 |
| 2013/0147838 A1 | 6/2013 | Small et al. | |
| 2013/0169682 A1 | 7/2013 | Novak et al. | |
| 2013/0178257 A1 | 7/2013 | Langseth | |
| 2013/0326364 A1 | 12/2013 | Latta et al. | |
| 2014/0002487 A1 | 1/2014 | Marison et al. | |
| 2014/0002491 A1 | 1/2014 | Lamb et al. | |
| 2014/0049559 A1 | 2/2014 | Fleck et al. | |
| 2014/0168264 A1 | 6/2014 | Harrison et al. | |
| 2014/0218291 A1 | 8/2014 | Kirk | |
| 2014/0368534 A1 | 12/2014 | Salter et al. | |
| 2014/0368535 A1 | 12/2014 | Salter et al. | |
| 2014/0372957 A1 | 12/2014 | Keane et al. | |

OTHER PUBLICATIONS

Ohshima, T. et al., "AR2Hockey: A Case Study of Collaborative Augmented Reality," IEEE Virtual Reality Annual International Symposium, Mar. 14, 1998, 8 pages.

Billinghurst, M. et al., "A Wearable Spatial Conferencing Space," 2nd IEEE International Symposium on Wearable Computers (ISWC '98), Oct. 19, 1998, 8 pages.

Billinghurst, M. et al., "Collaborative Mixed Reality," International Symposium on Mixed Reality (MR '99), Mar. 19, 1999, 14 pages.

Ando, T. et al., "Head Mounted Display for Mixed Reality using Holographic Optical Elements," Memoirs of the Faculty of Engineering, vol. 40, Sep. 30, 1999, 6 pages.

Raskar, R. et al., "Table-Top Spatially-Augmented Reality: Bringing Physical Models to Life with Projected Imagery," 2nd IEEE and ACM International Workshop on Augmented Reality (IWAR '99), Oct. 20, 1999, 8 pages.

Kato, H. et al., "Virtual Object Manipulation on a Table-Top AR Environment," IEEE and ACM International Symposium on Augmented Reality (ISAR 2000), Oct. 5, 2000, 9 pages.

Benko, H. et al., "Collaborative Mixed Reality Visualization of an Archaeological Excavation," 3rd IEEE and ACM International Symposium on Mixed and Augmented Reality (ISMAR '04), Nov. 2, 2004, 9 pages.

Piekarski, W. et al., "Augmented Reality Working Planes: A Foundation for Action and Construction at a Distance," 3rd IEEE and ACM International Symposium on Mixed and Augmented Reality (ISMAR '04), Nov. 2, 2004, 10 pages.

Cosco, F. et al. "Visuo-Haptic Mixed Reality with Unobstructed Tool-Hand Integration," IEEE Transactions on Visualization and Computer Graphics, vol. 19, No. 1, Apr. 17, 2012, 14 pages.

"Canon Launches New MR (Mixed Reality) System, Contributing to Shorter Development Times During Product Design," Canon Global News Release Archive Website, Available at http://www.canon.com/news/2012/jun18e.html, Jun. 18, 2012, 3 pages.

Milgram, et al., "A Taxonomy OF Mixed Reality Visual Displays", In Proceedings of IEICE Transactions on Information Systems, vol. E77-D, No. 12, Dec. 1994, 15 pages.

Princem, et al., "3-D Live: Real Time Interaction for Mixed Reality", In Proceedings of the ACM on Computer supported cooperative work video program, Nov. 16, 2002, pp. 364-371.

* cited by examiner

AUGMENTED-REALITY IMAGING

BACKGROUND

Augmented-reality devices may be configured to display one or more augmentation images overlaid on a physical space from a perspective of a user in order to provide an augmented view of the physical space to the user. For example, an augmentation image may provide an illusion that a virtual object (e.g., a hologram) is present in the physical space.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A two-dimensional augmentation image is rendered from a three-dimensional model from a first virtual perspective. A transformation is applied to the two-dimensional augmentation image to yield an updated two-dimensional augmentation image that approximates a second virtual perspective of the three-dimensional model without additional rendering from the three-dimensional model.

DETAILED DESCRIPTION

The present disclosure is directed to an approach for controlling an augmented-reality device to output augmentation imagery in a performant manner by reducing a number of image rendering operations that are performed by the augmented-reality device. In particular, the augmented-reality device may eschew continuously performing image rendering operations to output augmentation imagery (e.g., for display or as a mixed-reality recording) by employing various post-rendering re-projection techniques to produce augmentation images that approximate different real-world perspectives. For example, an augmentation image may be rendered from a first real-world perspective of a display that visually presents the augmentation image, and a transformation may be applied to the augmentation image to yield an updated augmentation image that approximates a second real-world perspective of a point-of-view camera used to create a mixed-reality recording. By performing such post-rendering re-projection techniques to visually present augmentation imagery, computational expense may be reduced.

Figure 1:
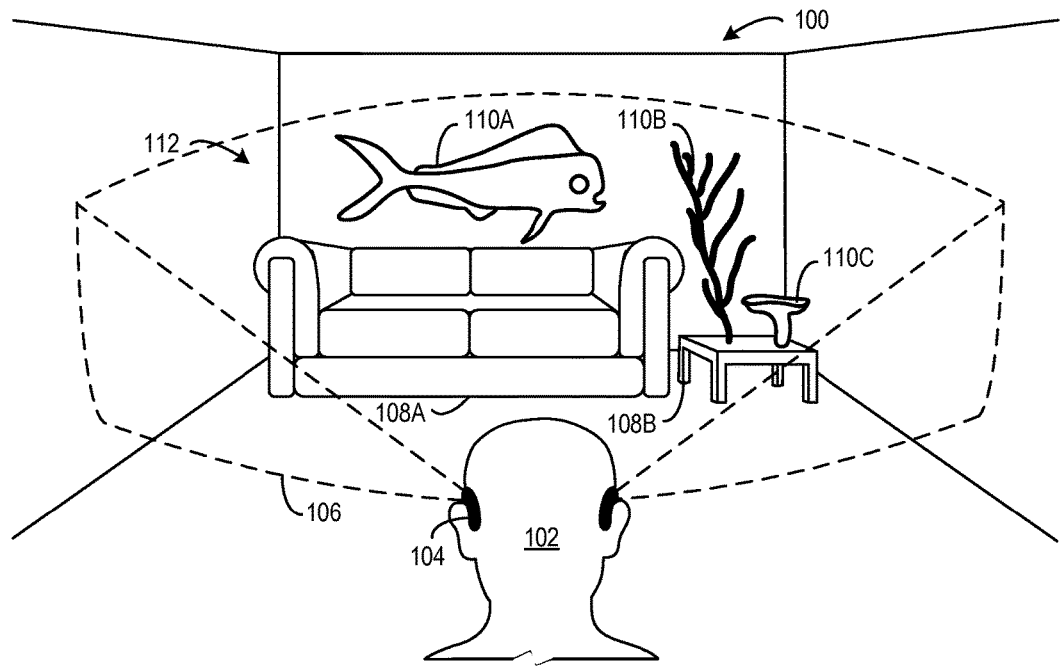
FIG. 1 shows an example physical space including a user wearing a head-mounted, at least partially see-through display device that is augmenting the physical space by visually presenting an augmentation image to the user via an at least partially see-through display.

FIG. 1 shows an example physical space 100 in which a user 102 is wearing an augmented-reality device in the form of a head-mounted, at least partially see-through display device (referred to herein as a head-mounted display (HMD)) 104. The HMD 104 provides the user 102 with an at least partially see-through field of view (FOV) 106 of the physical space 100. Because the HMD 104 is mounted on the user's head, the FOV 106 of the physical space 100 may change as a pose of the user's head changes.

The physical space 100 may include a plurality of real-world objects 108 (e.g., 108A, 108B) that may be visible to the user 102 within the FOV 106 of the HMD 104. Furthermore, the plurality of real-world objects 108 may be visible to other users in the physical space 100 that are not using an augmented-reality device to view the physical space 100.

The HMD 104 may be configured to visually present augmented-reality images to the user 102 in the FOV 106 of the HMD 104. These augmented-reality images may be displayed by display componentry of the HMD 104. As such, display light of the HMD 104 may be directed to a user eye so that the user will see augmented-reality images that are not actually present in the physical space. In at least partially see-through display implementations, such display light may be directed to the user eye while light from the physical space 100 passes through the HMD 104 to the user eye. As such, the user eye simultaneously receives light from the physical environment (e.g., light reflecting from couch 108A) and light from the at least partially see-through display.

The HMD 104 visually presents a plurality of augmented-reality objects 110 (e.g., 110A, 110B, 110C) that collectively form an augmentation image 112. In particular, a virtual fish 110A appears to be swimming above a real-world couch 108A, a virtual piece of seaweed 110B and a virtual piece of coral 110C appear to be located on a real-world end table 108B.

Note that the plurality of augmented-reality objects 110 may only be seen by users of augmented-reality devices, such as the user 102 via the HMD 104. In other words, the plurality of augmented-reality objects 110 may not be visible to other users in the physical space 100 that are not wearing HMDs because display light from the HMD does not reach the other users' eyes.

The HMD 104 may be configured to visually present augmented-reality images such that the displayed augmented-reality objects appear body-locked and/or world-locked. A body-locked augmented-reality object may appear to move with a perspective of the user 102 as a pose (e.g., 6 degrees of freedom (DOF): x, y, z, yaw, pitch, roll) of the HMD 104 changes. As such, a body-locked, augmented-reality object may appear to occupy the same portion of the FOV 106 and may appear to be at the same distance from the user 102, even as the user 102 moves in the physical space 100.

On the other hand, a world-locked, augmented-reality object may appear to remain in a fixed location in the physical space 100, even as the pose of the HMD 104 and the perspective of the user 102 changes. For example, the plurality of augmented-reality objects 110 may be world-locked, augmented-reality objects that appear to be located at the same real-world locations regardless of a perspective from which the user 102 views the plurality of augmented-reality objects 110. To support a world-locked, augmented-reality object, in one example, the HMD 104 may be configured to track a 6DOF pose of the HMD 104 and a geometric mapping/modeling of surface aspects of the physical space 100. Such tracking and mapping will be discussed in further detail below with reference to FIG. 11.

The HMD 104 may be configured to visually present augmented-reality images such that the displayed augmented-reality objects appear with hybrid body- and world-locking or without either body- or world-locking.

Figure 2:
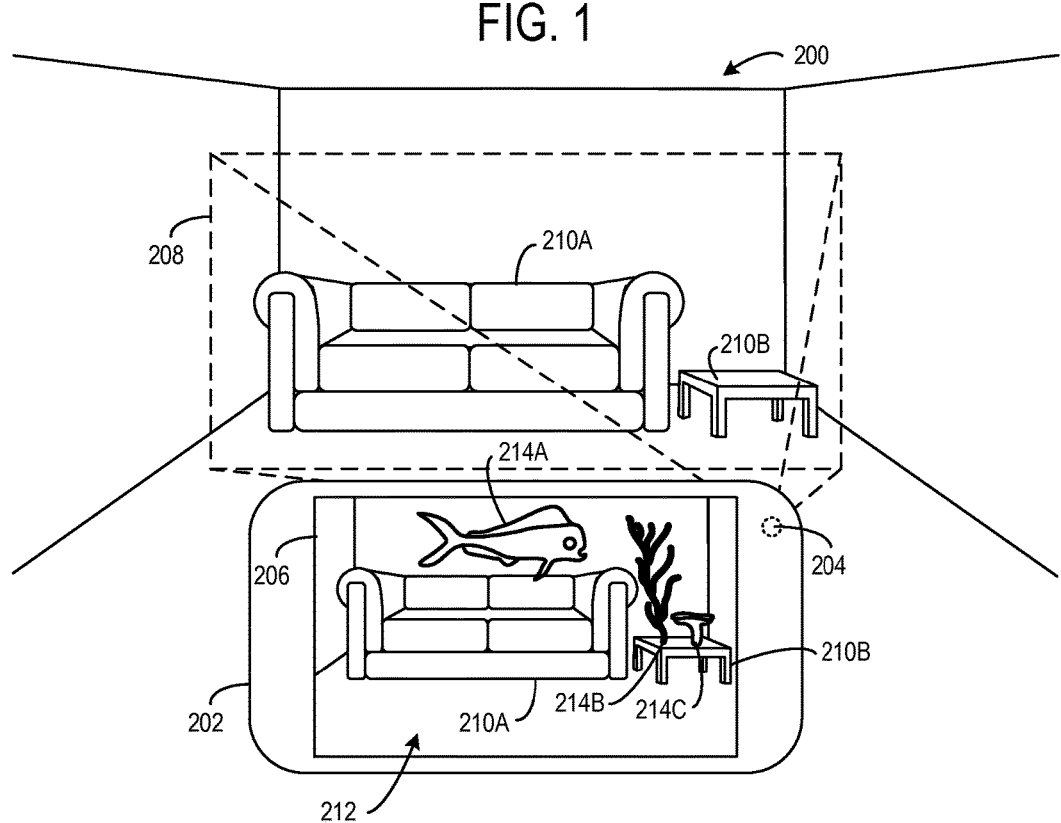
FIG. 2 shows an example physical space including an augmented-reality device that is augmenting the physical space by visually presenting a mixed-reality image via a display.

FIG. 2 shows another augmented-reality device in the form of a mobile computing device 202 including an outward-facing point-of-view camera 204 and a display 206. Mobile computing device 202 provides a mixed reality view of physical space 200. The point-of-view camera 204 images the physical space 200 within a field of view 208, and the display 206 displays the images captured by the point-of-view camera 204. In some implementations, the point-of-view camera 204 may be a visible-light camera.

The physical space 200 may include a plurality of real-world objects 210 (e.g., 210A, 210B) that may be visible to a user of the mobile computing device 202. Furthermore, the plurality of real-world objects 210 may be visible to other users in the physical space 200 that are not using an augmented-reality device to view the physical space 200.

The mobile computing device 202 may be configured to visually present a mixed-reality image 212 via the display 206. The mixed-reality image 212 may include an augmentation image layer overlaid on a visible-light image layer. The augmentation image layer includes a plurality of augmented-reality objects 214 (e.g., 214A, 214B, 214C). The visible-light image layer includes the plurality of real-world objects 210 located within the field of view 208 of the point-of-view camera 204. In particular, a virtual fish 214A appears to be swimming above a real-world couch 210A, a virtual piece of seaweed 214B and a virtual piece of coral 214C appear to be located on a real-world end table 210B.

Note that the plurality of augmented-reality objects 214 only may be seen by one or more users viewing the display 206. In other words, the plurality of augmented-reality objects 214 may not be visible to other users in the physical space 200.

In the above described augmented-reality device implementations, real-time augmentation of a physical space may provide an immersive and realistic mixed-reality experience. In order to facilitate such real-time augmentation, the augmented reality devices may perform various post-rendering re-projection techniques to produce augmentation images in a performant manner. In other words, such techniques may be less computationally expensive relative to continuously rendering augmentation imagery from three-dimensional models.

Figure 3:
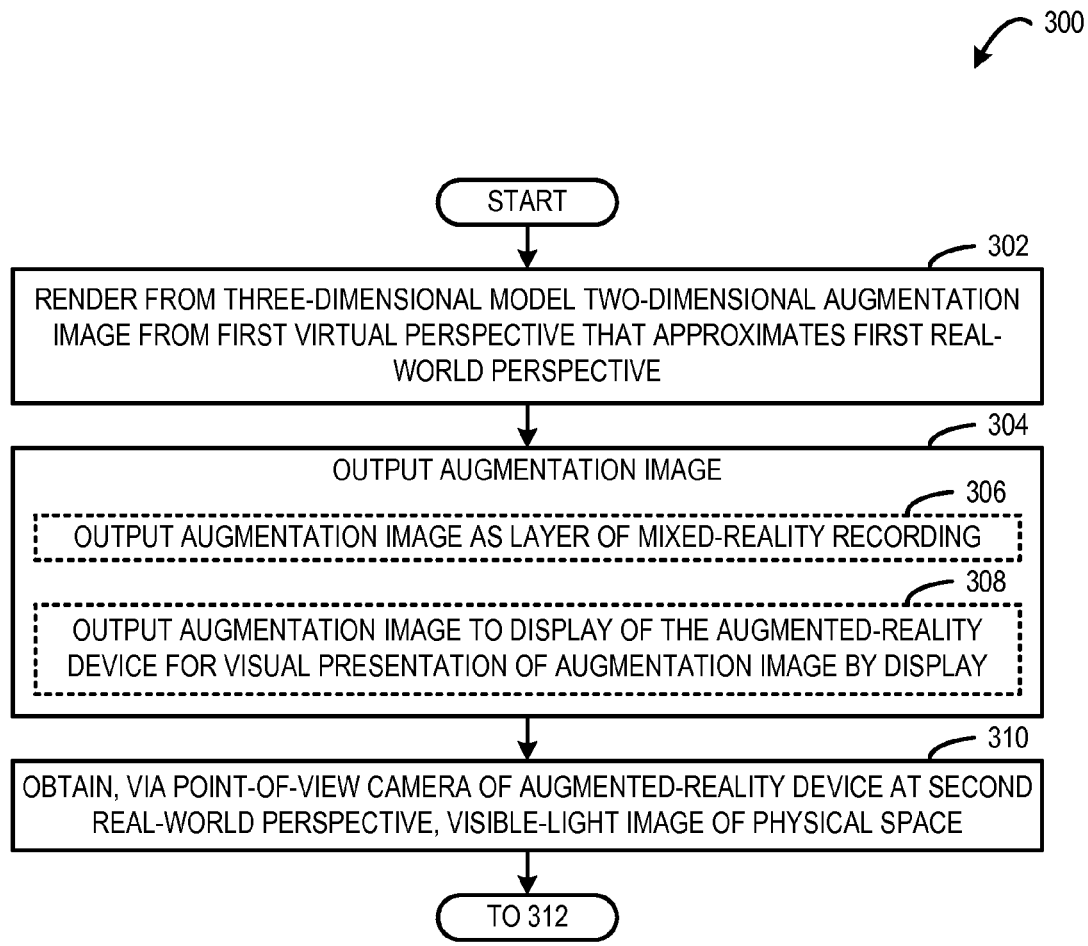
FIGS. 3-5 show an example method for providing a mixed-reality experience.
Figure 4:
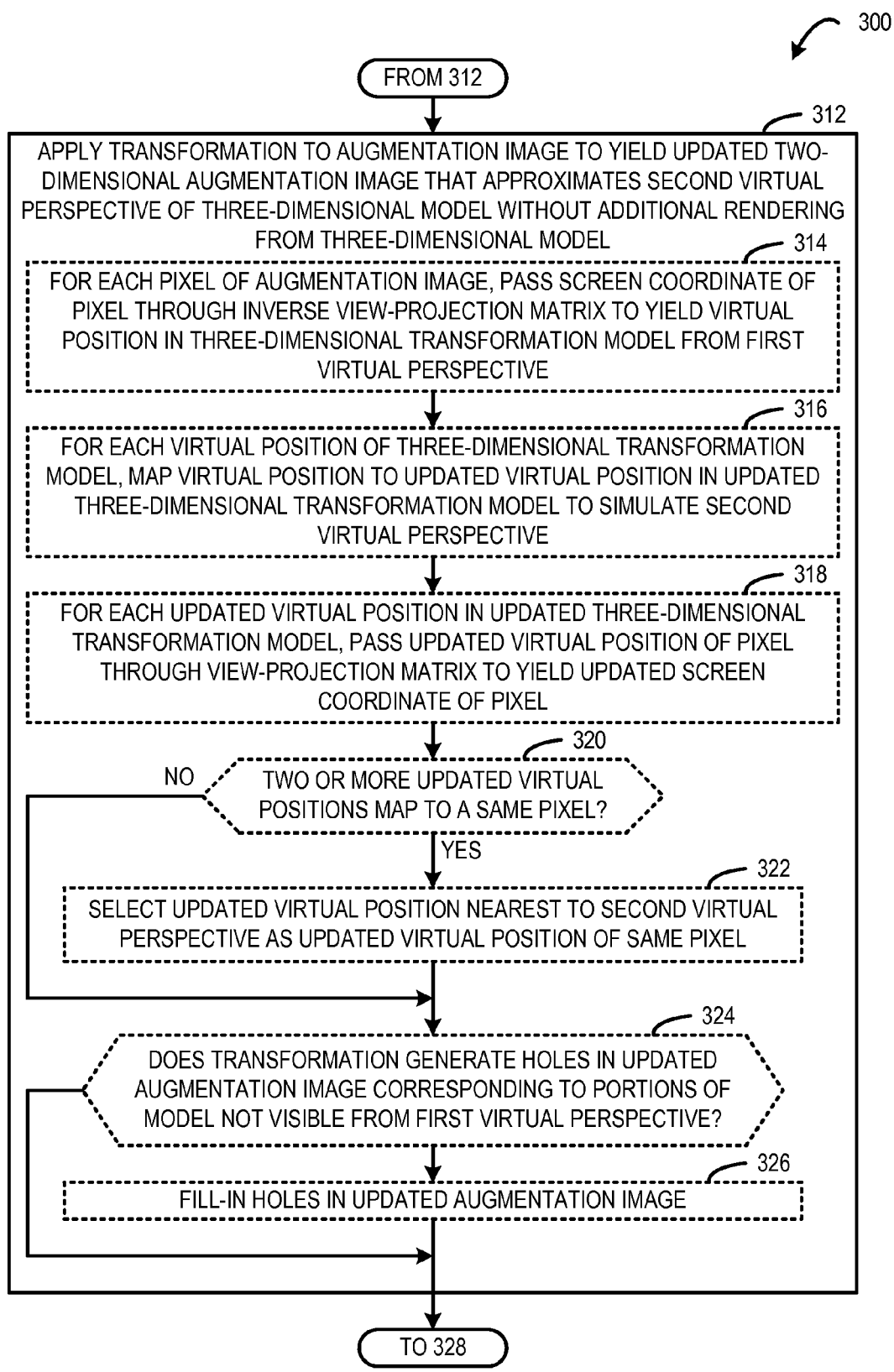
Figure 5:
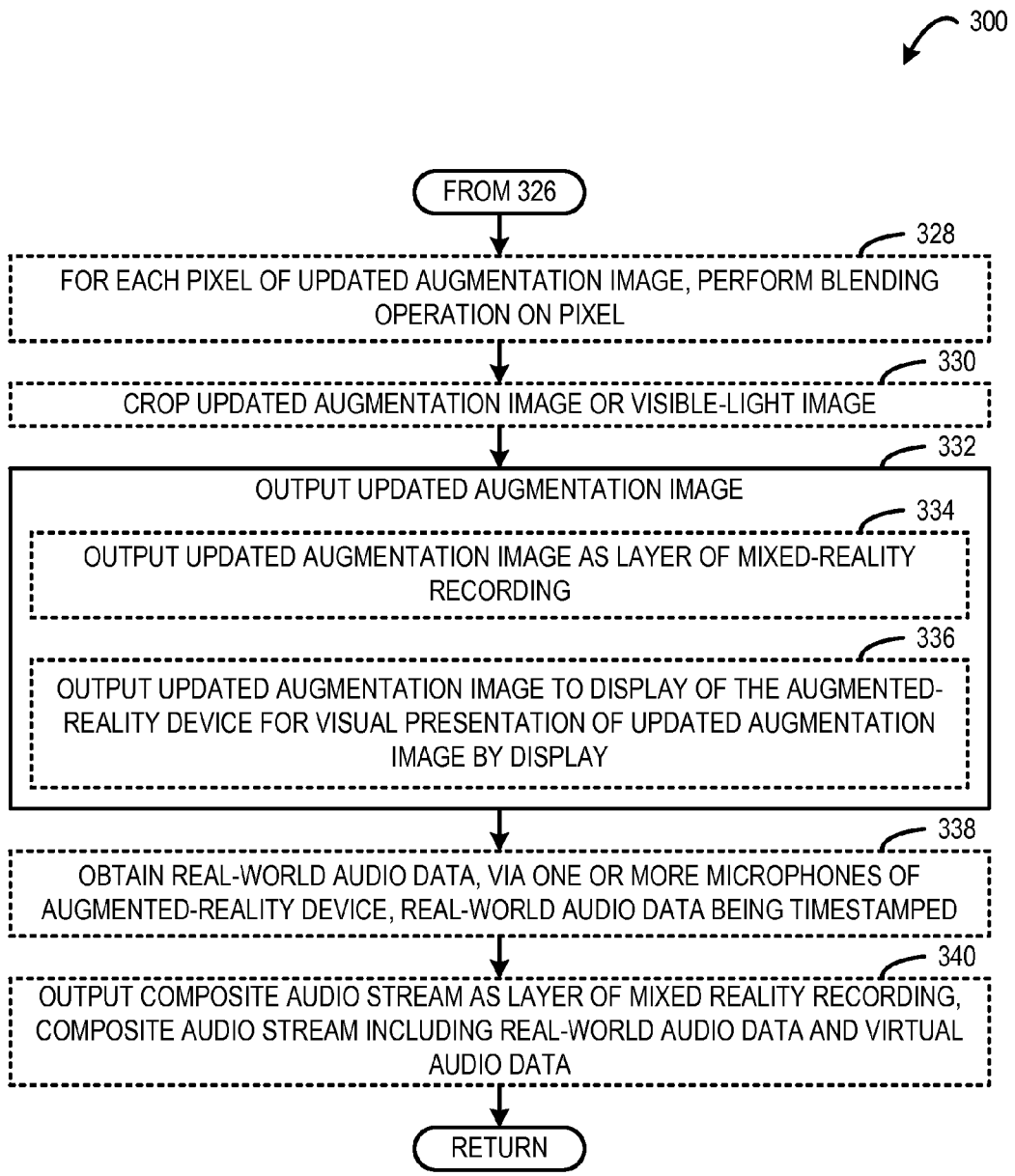

FIGS. 3-5 show an example method 300 for controlling an augmented-reality device to provide a mixed-reality experience in a performant manner. In one example, the method 300 is performed by the HMD 104 shown in FIG. 1. In another example the method 300 is performed by the mobile computing device 202 shown in FIG. 2. In another example, the method 300 is performed by an HMD 1100 shown in FIG. 11. In another example, the method 300 is performed by a computing system 1200 shown in FIG. 12. In general, the method 300 may be performed by any suitable augmented-reality device.

FIGS. 6-10 shows various operations that may be performed by an augmented-reality device (e.g., the HMD 104 shown in FIG. 1 or the mobile computing device 202 shown in FIG. 2) in the course of performing the method 300, and will be referenced throughout discussion of the method 300.

At 302, the method 300 may include rendering from a three-dimensional model a two-dimensional augmentation image from a first virtual perspective. The three-dimensional model may include any suitable virtual content (e.g., hologram) that may be produced by any suitable application of the augmented-reality device. For example, the three-dimensional model may include a virtual scene or virtual objects of a video game.

Figure 6:
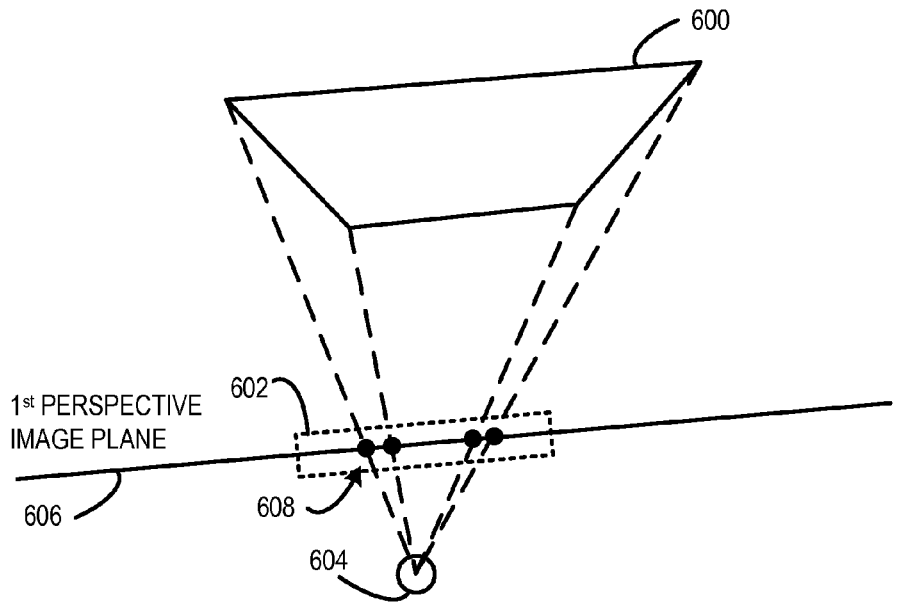
FIG. 6 shows an example three-dimensional model of an object rendered as a two-dimensional augmentation image from a first perspective.

FIG. 6 shows an example virtual model 600 being rendered as an augmentation image 602. The virtual model 600 and the augmentation image 602 are shown in simplified form. The virtual model 600 may be rendered as the augmentation image 602 from a first virtual perspective 604 (e.g., a virtual position of a virtual camera). In particular, a portion of the virtual model 600 that is viewable from the first virtual perspective 604 is projected onto a first image plane 606 as pixels 608 of the augmentation image 602 having screen coordinates defined in terms of the first virtual perspective 604.

Continuing with FIG. 3, at 304, the method 300 may include outputting the augmentation image. The augmentation image may be output by the augmented-reality device in any suitable manner.

In some implementations, at 306, the method 300 optionally may include outputting the augmentation image as a first layer of a mixed-reality recording. The mixed-reality recording may include a second layer including a visible-light image captured by the point-of-view camera of the augmented-reality device.

In some implementations, the mixed-reality recording may be stored in a storage machine (e.g., either local to the augmented-reality device or a remote storage machine, such as a network-connected storage machine) for visual presentation at a later time. In some implementations, the mixed-reality recording may be sent, via a network connection, to a remote or external display device for visual presentation by the remote display device. For example, the mixed-reality recording may be sent to an external display in order to provide a user that is not wearing an HMD a view that approximates the augmented perspective of the wearer of the HMD.

In some implementations, at 308, the method 300 optionally may include outputting the augmentation image to a display of the augmented-reality device for visual presentation of the augmentation image by the display.

In some implementations where the augmented-reality device includes an at least partially see-through display (e.g., HMD 104 shown in FIG. 1) the augmentation image may be visually presented, via the at least partially see-through display of the augmented-reality device, while light from the physical space passes through the at least partially see-through display to a user eye.

In some implementations, the augmentation image may be visually presented, via the display of the augmented-reality device, as a first layer of a first mixed-reality image. The first mixed-reality image may include a second layer including the first visible-light image of the physical space. Note that the first mixed-reality image may be visually presented via an at least partially see-through display or a display that is not see-through.

At 310, the method 300 may include obtaining, via a point-of-view camera of the augmented-reality device at a second real-world perspective, a visible-light image of the physical space. For example, the visible-light image may be obtained to generate a mixed-reality recording, determine extrinsic and intrinsic calibration data of the point-of-view camera/HMD, and/or to perform other optical analysis.

In some implementations, each visible-light image produced by the point-of-view camera may be tagged with metadata including extrinsic and intrinsic calibration data of the point-of-view camera. The extrinsic and intrinsic calibration data may be used to spatially register virtual content to the physical space.

The extrinsic calibration data defines a real-world position of the point-of-view camera. In one example, the extrinsic calibration data may include parameters that denote coordinate system transformations from three-dimensional world coordinates to three-dimensional camera coordinates. In another example, the extrinsic calibration data may define the position of the point-of-view camera's center and the point-of-view camera's heading in real-world world coordinates (e.g., the real-world pose). The extrinsic calibration data may be associated with each image frame as it represents a pose that changes based on frame-by-frame movement.

The intrinsic calibration data defines a configuration of the point-of-view camera. In one example, the intrinsic calibration data may include camera parameters that define a focal length, image sensor format, and principal point. The intrinsic calibration data may also be associated with each image frame as it may be dynamically modified on a frame-by-frame basis (e.g., video stabilization or cropping is enabled, or the interpupillary distance (IPD) changes).

Turning to FIG. 4, at 312, the method 300 may include applying a transformation to the augmentation image to yield the updated two-dimensional augmentation image that approximates the second virtual perspective of the three-dimensional model without additional rendering from the three-dimensional model. Any suitable transformation or series of transformations may be applied to the augmentation image having the first virtual perspective to yield the updated augmentation image having the second virtual perspective without departing from the scope of this disclosure.

In one example, the change in virtual perspective may correspond to a change in position between a point-of-view camera imaging the physical space and an at least partially see-through display that is viewed by a user eye. In another example, the change in virtual perspective may correspond to a change in position between different displays of a stereoscopic display (e.g., a left-eye display and a right-eye display). The change in virtual perspective may correspond to a change in position between any suitable different real-world perspectives.

In some implementations, each visible-light image produced by a point-of-view camera of the augmented-reality device may be tagged with a real-world timestamp. Further, the three-dimensional model may utilize a virtual camera that provides a virtual perspective from which the three-dimensional model may be viewed at any given time. The virtual perspective of the virtual camera at a designated point in time may be defined by a virtual image frame. Each virtual image frame may be tagged with a virtual timestamp.

Accordingly, in some such implementations, the transformation may be selected or determined based on a real-world timestamp of a visible-light image obtained by the point-of-view camera. In particular, a position and orientation of the augmented-reality device may be determined at each timestamp, and a delta between timestamps may be used in transforming an augmentation image to an updated augmentation image. For example, the virtual and/or real-world timestamps may be used to predict the pose or extrinsic position of the point-of-view camera at a particular time for which an updated augmentation image is desired. In this way, the updated augmentation image will better align with corresponding real-world images when generating a mixed reality recording Such an approach may be particularly applicable in cases where a frame rate of the virtual camera differs from a frame rate of the point-of-view camera.

Figure 8:
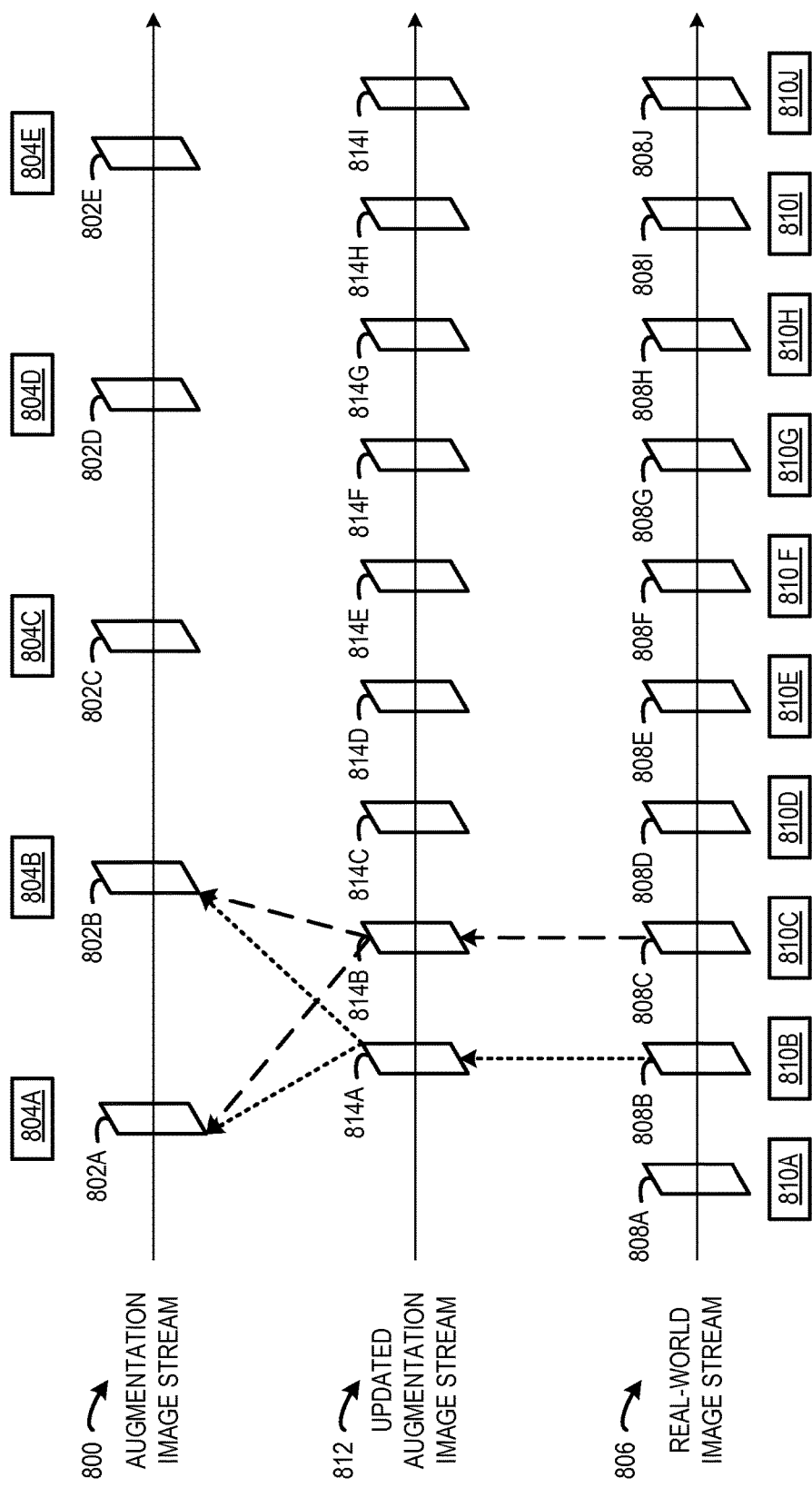
FIG. 8 shows example virtual and real-world image streams that may be synchronized using corresponding timestamps.

FIG. 8 shows example video streams that may be produced by an augmented-reality device (e.g., the HMD 104 shown in FIG. 1 or the mobile computing device 202 shown in FIG. 2). An augmentation image stream 800 may include a plurality of augmentation image frames 802 (e.g., 802A, 802B, 802C, 802D, 802E). Each of the plurality of augmentation image frames 802 may be rendered from a three-dimensional model. Each of the plurality of augmentation image frames 802 may include a virtual timestamp 804. A real-world (e.g., visible-light) image stream 806 may include a plurality of real-world image frames 808 (e.g., 808A, 808B, 808C, 808D, 808E, 808F, 808G, 808H, 808I, 808J). Each of the plurality of real-world image frames 808 may be obtained from the point-of-view camera. Each of the plurality of real-world image frames 808 may include a real-world timestamp 810. In the illustrated example, the augmentation image stream 800 and the real-world image stream 806 are depicted as having different frame rates. An updated augmentation image stream 812 may include a plurality of updated augmentation image frames 814 (e.g., 814A, 814B, 814C, 814D, 814E, 814F, 814G, 814H, 814I). Each of the plurality of augmentation image frames 802 may be generated by applying a transformation to a corresponding augmentation image 802.

In the illustrated example, the real-world image stream 806 has a higher frame rate than the augmentation image stream 800. In order to generate an accurate mixed-reality recording in which each real-world image frame is layered with virtual content, updated augmentation image frames may be generated to accurately represent the virtual content in the mixed-reality recording in between successive augmentation image frames being rendered. In particular, a transformation may be selected to be applied to a given augmentation image frame to yield a corresponding updated augmentation image frame based on a real-world time stamp of a corresponding real-world image frame.

For example, real-world image frame 808B and real-world image frame 808C are obtained via the point-of-view camera after augmentation image frame 804A has been rendered but prior to augmentation image 804B being rendered. Instead of layering augmentation image 804A on both real-world image frames 808B and 808C, different transformations may be applied to augmentation image frame 804A to yield updated augmentation image frames 814A and 814B that correspond to real-world image frame 808B and real-world image frame 808C, respectively. In particular, the pose or extrinsic position data of timestamp 810B may be used to select/apply the transformation that yields the updated augmentation image 814A, and the extrinsic data of timestamp 810C may be used to select/apply a different transformation that yields the updated augmentation image 814B. The extrinsic data in each timestamp may be used to approximate the perspective of the augmented-reality device when the real-world image is obtained. In this way, the updated augmentation image frames may be generated to accurately represent the virtual content in between the augmentation images being rendered.

A real-world timestamp and associated data of a real-world image frame may be used to select/apply a transformation in any suitable manner without departing from the scope of this disclosure. In some implementations, the augmented image stream 800 and the real-world image stream 806 may have the same frame rate, and thus there may be a one-to-one correlation between virtual and real-world content.

In some implementations, the transformation (or re-projection) of the augmentation from the first virtual perspective to the updated augmentation image from the second virtual perspective may be a perspective transform (e.g., homography). Accordingly, in some implementations, at 314, the method 300 optionally may include, for each pixel of the augmentation image, passing a screen coordinate of the pixel through an inverse view-projection matrix to yield a virtual position in a three-dimensional transformation model from the first virtual perspective.

Figure 7:
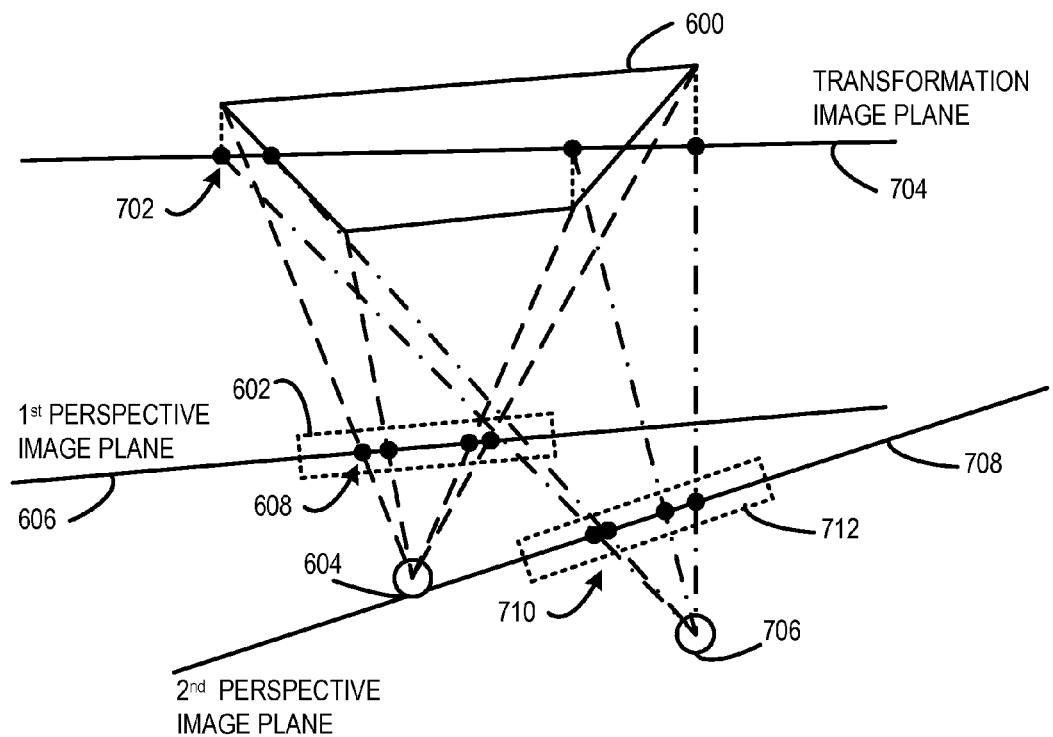
FIG. 7 shows a perspective transformation of the augmentation image of the object of FIG. 6 to an updated two-dimensional augmentation image from a second perspective.

In FIG. 7, screen coordinates of each of the pixels 608 may be projected from the first image plane 606 of the first virtual perspective 604 to a virtual position 702 on a transformation image plane 704. The virtual positions 702 projected on the transformation image plane 704 and defined in terms of the coordinate system of the first virtual perspective 604 may represent the three-dimensional transformation model. In one example, the transformation image plane 704 may have a designated depth in virtual space that may be predetermined. In another example, the transformation image plane 704 may have a depth that is provided by an application that is rendering the virtual model 600.

Continuing with FIG. 4, at 316, the method 300 optionally may include, for each virtual position of the three-dimensional transformation model, mapping the virtual position to an updated virtual position in an updated three-dimensional transformation model to simulate the second virtual perspective.

Returning to FIG. 7, the virtual positions 702 on the transformation image plane 704 may be mapped (e.g., rotation+translation) from the coordinate system of the first virtual perspective 604 to a coordinate system of the second virtual perspective 706. The virtual positions 702 projected on the transformation image plane 704 and defined in terms of the coordinate system of the second virtual perspective 706 may represent the updated three-dimensional transformation model.

At 318, the method 300 optionally may include, for each updated virtual position in the updated three-dimensional transformation model, passing the updated virtual position of the pixel through a view-projection matrix to yield an updated screen coordinate of the pixel.

Returning to FIG. 7, the virtual positions 702 projected on the transformation image plane 704 and defined in terms of the coordinate system of the second virtual perspective 706 may be projected to a second image plane 708 of the second virtual perspective 706 to yield pixels 710 of the updated augmentation image 712 having screen coordinates defined in terms of the second virtual perspective 706.

In one example, the above described homography is described in terms of a point X. The point X may be representative of any point in the virtual model that maps to a pixel of the augmentation image. The point X has three-dimensional coordinates that are relative to a camera-centered coordinate system in the three-dimensional real-world space. X is represented by a 4 dimensional vector:

$$X = \begin{pmatrix} x \\ y \\ z \\ 1 \end{pmatrix}$$

X1 is the position of the point X that is projected onto the first image plane and defined in terms of the coordinate system of the first virtual perspective that is spatially registered to the first real-world perspective of the first visible-light image. X1 is represented by a 3 dimensional vector:

$$X_1 = \begin{pmatrix} x_1 \\ y_1 \\ 1 \end{pmatrix}$$

$$X_1 = K_1[R_1 \mid t_1]X$$

$$X_1 = K_1 R_1 X + K_1 t_1$$

this is the transformation induced by the pose of the unit at the time of the first camera frame. $[R_1|t_1]$ is the rotation and translation matrix to move the point X to the coordinate system of the real-world perspective of the first visible-light image (e.g., the extrinsic calibration data). $K_1$ is the projection matrix associated with the first visible-light image (e.g., the camera a.k.a. the 3×3 camera intrinsic matrix).

X2 is the position of the point X that is projected onto the second image plane and defined in terms of the coordinate system of the second virtual perspective that is spatially registered to the second real-world perspective of the second visible-light image. X2 is represented by a 3 dimensional vector:

$$X_2 = \begin{pmatrix} x_2 \\ y_2 \\ 1 \end{pmatrix}$$

$$X_2 = K_2[R_2 \mid t_2]X$$

$$X_2 = K_2 R_2 X + K_2 t_2$$

This is the transformation induced by the pose of the unit at the time of the second camera frame. $[R_2|t_2]$ is the rotation and translation matrix to move the point X to the coordinate system of the real-world perspective of the second visible-light image (e.g., the extrinsic calibration data). $K_2$ is the projection matrix of the second visible-light image (e.g., the camera a.k.a. the 3×3 camera intrinsic matrix).

The matrix for the above described homography (e.g., rotation+translation+projection) to transform the first virtual perspective to the second virtual perspective is given by:

$$X_2 = K_2[R_2 \mid t_2]X$$

$$= K_2 R_2 X + K_2 t_2$$

-continued $$= zK_2R_2R_1^{-1}K_1^{-1}(X_1 - K_1t_1) + K_2t_2$$

$$= zK_2R_2R_1^{-1}K_1^{-1}X_1 + K_2t_2 - zK_2R_2R_1^{-1}t_1$$

z is the designated depth of the transformation image plane. In some implementations, any point whose depth has been normalized (e.g., lost) during the transformation may be upprojected so as not to corrupt the updated augmentation image.

The above described transformation may be parallelizable. Accordingly, in one example, the augmented-reality device may perform the above described transformation using a compute Shader that performs parallel operation with low performance overhead.

In some implementations, the transformation applied to the augmentation image may be an affine transformation (e.g., a linear transformation that is a subset of the homography family). In some implementations, the transformation applied to the augmentation image may be a translation (e.g., a simple subset of the affine transformations).

Continuing with FIG. 4, in some cases, the view-projection matrix used to yield the updated screen coordinates of the updated virtual positions may cause two updated virtual positions to map to the same pixel of the updated augmentation image. Accordingly, in some implementations, at 320, the method 300 optionally may include, determining whether two or more updated virtual positions map to a same pixel. If two or more updated virtual positions map to the same pixel of the updated augmentation image, the method 300 moves to 322. Otherwise, the method 300 moves to 324.

In one example, in order to make this determination, a depth value that was used to generate each pixel of the rendered augmentation image may be stored as metadata (e.g., via a depth buffer) for the augmentation image. The depth value may be used to determine a three-dimensional virtual position of the pixel and re-projected position.

At 322, the method 300 optionally may include selecting an updated virtual position of the two or more updated virtual positions that is nearest to the second virtual perspective as the updated virtual position of the pixel in the updated augmentation image.

Figure 9:
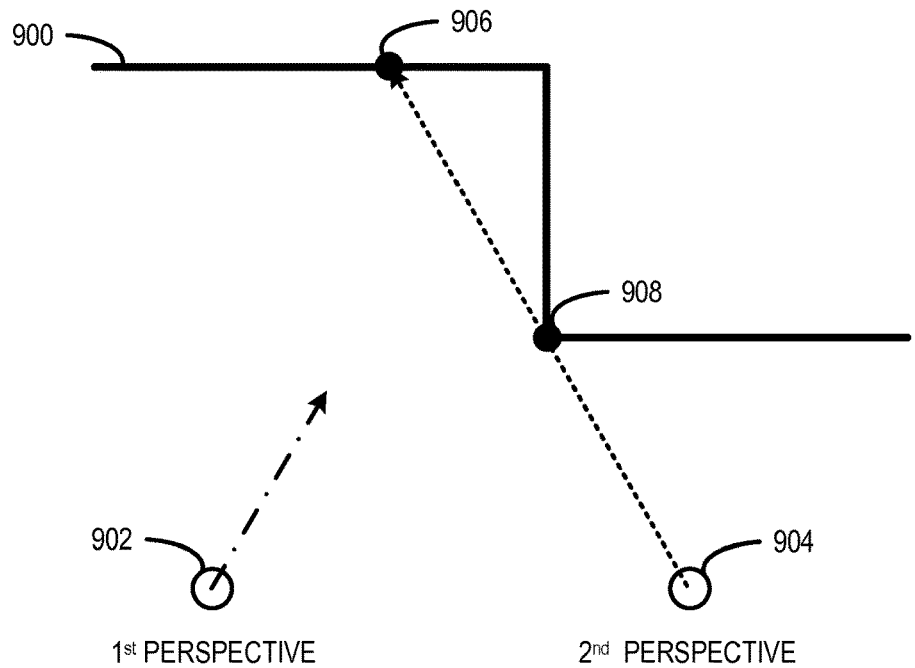
FIG. 9 shows an example approach for handling a scenario where a perspective transformation of an augmentation image causes two virtual positions to be mapped to a same pixel.

FIG. 9 shows an example virtual model 900 that may be viewed from a first virtual perspective 902 (e.g., the augmentation image) and a second virtual perspective 904 (e.g., the updated augmentation image). The virtual model 900 includes a first point 906 and a second point 908. When the virtual model 900 is viewed from the first virtual perspective 902 (e.g., rendered as the augmentation image), the first point 906 and the second point 908 may be visible. However, when the virtual model 900 is viewed from the second virtual perspective 904 (e.g., re-projected to the updated augmentation image), the virtual positions of the first point 906 and the second point 908 may map to the same pixel. In such a scenario, a depth of each point may be compared, and the point that is nearest to the second virtual perspective 904 may be selected as the virtual position that is mapped to the pixel. In the example of FIG. 9, point 908 is nearer to second virtual perspective 904 than point 906. As such, point 908 would be selected as the virtual position mapped to the pixel.

In one particular example, the augmented-reality device may perform the above described depth test using a compute Shader. In particular, two compute Shader passes may be employed. The first pass may find a re-projected position of each virtual (e.g., hologram) pixel and update an intermediate depth buffer. The second pass finds the re-projected position of each virtual (e.g., hologram) pixel and compares it with the minimum value in the depth buffer. If the depth value of the pixel is greater than the depth value in the depth buffer, then the depth value is discarded. Otherwise, the depth value is used for the updated augmentation image.

Continuing with FIG. 4, in some cases, the view-projection matrix used to yield the updated screen coordinates of the pixels of the updated augmentation image may generate holes due to the updated virtual position of the virtual model not being visible from the first virtual perspective. Accordingly, in some implementations, at 324, the method 300 optionally may include, determining whether the transformation generates holes in the updated augmentation image corresponding to portions of virtual model not visible from the first virtual perspective. If it is determine that holes are generated in the updated augmentation image, the method 300 moves to 326. Otherwise, the method 300 moves to 328.

At 326, the method 300 optionally includes filling-in the holes of the updated augmentation image. Any suitable hole-filling approach may be employed without departing from the scope of the present disclosure. For example, if a different visible-light image from a different real-world perspective is accessible, then the different visible-light image may be used to identify the missing portions of the updated augmentation image. In one example, the different visible-light image may be obtained when the augmented-reality device is in a different real-world position. In another example, the different visible-light image may be obtained from another camera of the augmented-reality device having a different real-world position. In another example, the different visible-light image may be obtained from a remote camera having a different real-world position and being in communication with the augmented-reality device. Hole-filling approaches that do not use additional images may be used (e.g., extrapolation, interpolation, or pattern matching).

Figure 10:
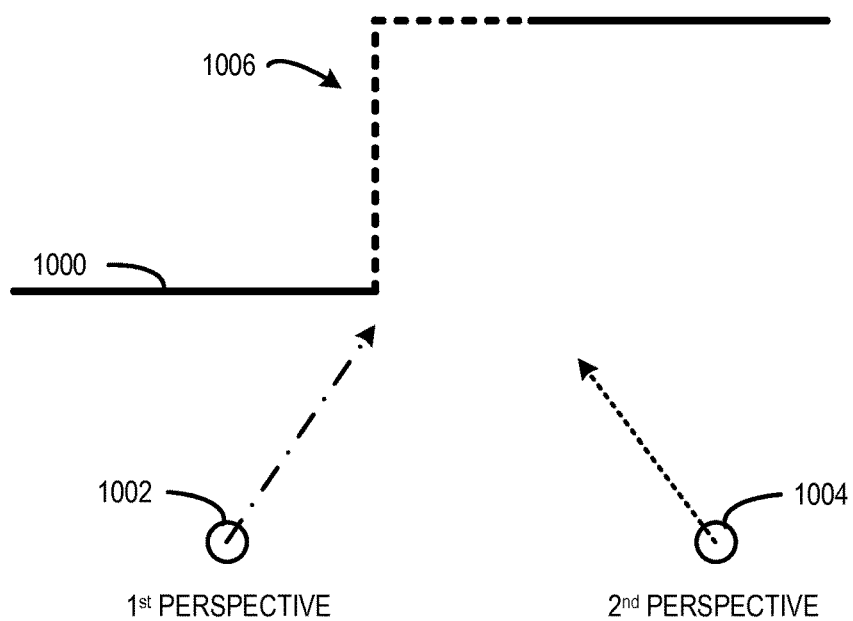
FIG. 10 shows an example approach for handling a scenario where a perspective transformation of an augmentation image produces missing pixels in an updated augmentation.

FIG. 10 shows an example virtual model 1000 that may be viewed from a first virtual perspective 1002 (e.g., the augmentation image) and a second virtual perspective 1004 (e.g., the updated augmentation image). When the virtual model 1000 is viewed from the first virtual perspective 1002 (e.g., rendered as the augmentation image), an occluded portion 1006 (indicated by dotted lines) is not visible from the first virtual perspective 1002. When the transformation is applied to the augmentation image to simulate the second virtual perspective 1004, the portion 1006 becomes visible. However, because the portion 1006 was not visible in the augmentation image, there is no pixel information corresponding to the portion 1006 to be transformed. As such, holes are generated in the updated augmentation image. Such holes may be filled in the updated augmentation image according to a hole filling approach as described above.

Turning to FIG. 5, in some implementations, at 328, the method 300 optionally may include, for each pixel of the updated augmentation image, performing a blending operation on the pixel.

In some implementations, when the augmentation image is rendered, an Alpha Channel value may be stored as metadata for each pixel of the augmentation image. Accordingly, in some implementations, the blending operation may be performed on the pixel based on the Alpha channel value of the pixel. In some implementations, the blending operation may be performed differently by different applications executed by the augmented-reality device. In other words, by making the Alpha Channel value available upon rendering the augmentation image, each application may be able to provide a customized blend. In some implementations, the augmented-reality device may include blend logic that combines an alpha function with a luminance of each pixel to provide a final brightening pass to the holograms to increase an opacity of the virtual content of the updated augmentation image. In some implementations, the blending operation may include anti-aliasing or analyzing of the real-world pixels of the visible-light image to determine a proper blend. For example, if a real-world pixel is very dark, the blend may decide to boost the brightness of the matching virtual (e.g., hologram) pixel to increase the effective contrast. In some implementations, the point-of-view camera and the rendered content may have different resolutions, and the blending operation may be performed to modify one or more of the different resolutions. The blending operation may be performed in any suitable manner. For example, the blending operation may be performed without using the Alpha Channel value.

At 330, the method 300 optionally may include cropping the updated augmentation image or the visible-light image.

In some implementations, when the transformation is applied to the augmentation image either the virtual or real-world content may end up clipped or cut-off depending on the amount of re-projection that is performed. Accordingly, in some implementations, the extrinsic and intrinsic calibration data can be used to dynamically crop the larger of the updated augmentation image and the visible-light image to match a smaller of the updated augmentation image and the visible-light image. In this way, any clipping may be removed or the virtual or real-world content may be centered in the mixed-reality recording or the display. In some implementations, the updated augmentation image may have dimensions that are larger than dimensions of a field of view of the display. Accordingly, the updated augmentation image may be cropped to approximate the dimensions of the field of view of the display. In some implementations, the visible-light image may have dimensions that are larger than dimensions of the updated augmentation image. Accordingly, the visible-light image may be cropped to approximate the dimensions of the updated augmentation image.

At 332, the method 300 may include outputting the updated augmentation image. The updated augmentation image may be output by the augmented-reality device in any suitable manner.

In some implementations, at 334, the method 300 optionally may include outputting the updated augmentation image as a first layer of a mixed-reality recording. The mixed-reality recording may include a second layer including a visible-light image captured by the point-of-view camera of the augmented-reality device. The updated two-dimensional augmentation image and the visible light image may be combined in the mixed-reality recording in any suitable manner without departing from the scope of the present disclosure.

In some implementations, the mixed-reality recording may be stored in a storage machine (e.g., either local to the augmented-reality device or a remote storage machine, such as a network-connected storage machine) for visual presentation at a later time. In some implementations, the mixed-reality recording may be sent, via a network connection, to a remote display device for visual presentation by the remote display device.

In some implementations, at 336, the method 300 optionally may include outputting the updated augmentation image to a display of the augmented-reality device for visual presentation of the updated augmentation image by the display.

In some implementations where the augmented-reality device includes an at least partially see-through display (e.g., HMD 104 shown in FIG. 1), the updated augmentation image may be visually presented via the at least partially see-through display of the augmented-reality device, while light from the physical space passes through the at least partially see-through display to a user eye.

In some implementations, the updated augmentation image may be visually presented, via the display of the augmented-reality device, as a first layer of a second mixed-reality image. The second mixed-reality image may include a second layer including the second visible-light image of the physical space. Note that the second mixed-reality image may be visually presented via an at least partially see-through display or a display that is not see-through.

In some implementations, the augmentation image may be output to a display of the augmented-reality device for visual presentation by the display, and the updated augmentation image may be output to the mixed-reality recording. In some implementations, the augmentation image may be output to the mixed-reality recording, and the updated augmentation image may be output to the display of the augmented-reality device for visual presentation by the display. In some implementations, the augmentation image and the updated augmentation image may be output to the mixed-reality recording. In some implementations, the augmentation image and the updated augmentation image may be output to the display of the augmented-reality device for visual presentation by the display. In some implementations, the augmentation image and the updated augmentation image may be output to both the display of the augmented-reality device for visual presentation by the display and to the to the mixed-reality recording.

In some implementations where a mixed-reality recording is output by the augmented-reality device, the mixed-reality recording may include an audio component. Accordingly, at 338, the method 300 optionally may include obtaining real-world audio data, via one or more microphones of the augmented-reality device. The real-world audio data may be timestamped in order to be synchronized with other layers of the mixed-reality recording. In particular, in order to provide an accurate mixed-reality experience, both virtual and real-world audio streams may be captured and synchronized with each other via virtual and real-world timestamps to form a composite audio stream.

In some implementations, at 340, the method 300 optionally may include outputting the composite audio stream as a layer of the mixed-reality recording. In particular, the composite audio stream may be synchronized with a composite video stream that includes virtual and real-world video layers. The composite audio stream and the composite video stream may be synchronized via virtual and real-world timestamps of the virtual and real-world audio and video data.

Although the method is described in terms of rendering and re-projecting an augmentation image for visual presentation in real-time, in some implementations, one or more of the above described techniques may be performed as post-processing operations. In one example, each virtual and real-time video and audio stream may be separately stored or streamed to a remote device and composited later (e.g., utilizing timestamping, extrinsic and intrinsic calibration data, and/or other metadata). Real-time composition may allow visual presentation on the display of the augmented-reality device as well as live streaming to other remote displays. In this case, performance may be prioritized over the quality of the end result in order to meet the requirements of real-time. However, in some cases, the post-processing of mixed-reality video and audio at a later time may be desired to provide a higher quality mixed reality composition. For example, additional and/or more computationally expensive processing operations may be performed on the virtual and real-world streams as post-processing operations to provide a mixed-reality presentation meant for playback (e.g., a demonstration or presentation video). The above described concepts may be performed at any time or in any manner without departing from the scope of the present disclosure.

The image transformations described herein to update an augmentation image without additional rendering optionally may be employed with pre and post-processing of a video stream. For example, the pose tracking of the augmented-reality device can be used to correct a rolling shutter effect (present in most CMOS sensor-based cameras) of the real-world frames (pre-processing), camera shake (e.g., video stabilization), or the mixed-world output (post-processing).

In some implementations, the above described image transformations may be applied to two or more point-of-view cameras having different perspectives. For example, the image transformations could be applied to a stereoscopic configuration where two augmentation images with different perspective are visually presented to two displays (e.g., left eye, right eye).

Figure 11:
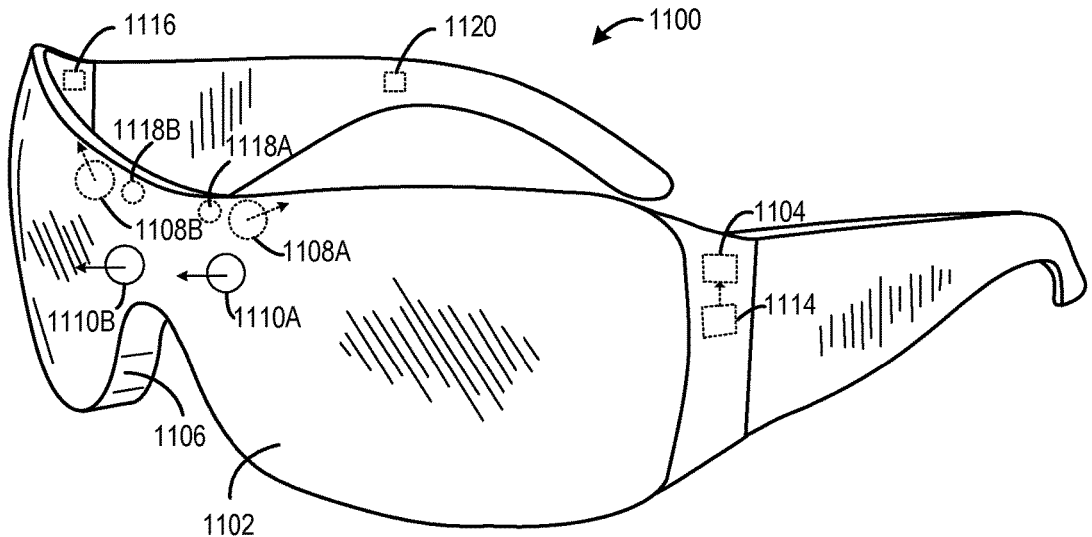
FIG. 11 shows an example head-mounted, at least partially see-through display device.

FIG. 11 shows a non-limiting example of a head-mounted, near-eye, at least partially see-through display system, also referred to as an HMD 1100, in the form of wearable glasses with an at least partially see-through display 1102. For example, the HMD 1100 may be a non-limiting example of the HMD 104 of FIG. 1, and/or the computing system 1200 of FIG. 12. An HMD may take any other suitable form in which a transparent, semi-transparent, and/or non-transparent display is supported in front of a viewer's eye or eyes. Further, implementations described herein may be used with any other suitable computing device, including but not limited to mobile computing devices, laptop computers, desktop computers, tablet computers, other wearable computers, etc. For example, an augmented-reality image may be displayed on a mobile phone's display along with real world imagery captured by the mobile phone's camera.

The HMD 1100 includes an at least partially see-through display 1102 and a controller 1104. The controller 1104 may be configured to perform various operations related to visual presentation of augmented-reality and mixed-reality image on the at least partially see-through display 1102.

The at least partially see-through display 1102 may enable images such as augmented-reality images (also referred to as augmentation images or holograms) to be delivered to the eyes of a wearer of the HMD. The at least partially see-through display 1102 may be configured to visually augment an appearance of a real-world, physical environment to a wearer viewing the physical environment through the at least partially see-through display 1102. In one example, the at least partially see-through display 1102 may be configured to display one or more UI objects of a graphical user interface. In some implementations, the UI objects presented on the graphical user interface may be virtual objects seemingly intermixed with the real-world environment. Likewise, in some implementations, the UI objects presented on the graphical user interface may incorporate elements of real-world objects of the real-world environment seen through the at least partially see-through display 1102. In other examples, the display may be configured to display one or more other graphical objects, such as virtual objects associated with games, videos, or other visual content.

Any suitable mechanism may be used to display images via the at least partially see-through display 1102. For example, the at least partially see-through display 1102 may include image-producing elements located within lenses 1106 (such as, for example, a see-through Organic Light-Emitting Diode (OLED) display). As another example, the at least partially see-through display 1102 may include a display device (such as, for example a liquid crystal on silicon (LCOS) device or OLED microdisplay) located within a frame of HMD 1100. In this example, the lenses 1106 may serve as, or otherwise include, a light guide for delivering light from the display device to the eyes of a wearer. Such a light guide may enable a wearer to perceive a 3D holographic image located within the physical environment that the wearer is viewing, while also allowing the wearer to directly view physical objects in the physical environment, thus creating a mixed-reality environment. Additionally or alternatively, the at least partially see-through display 1102 may present left-eye and right-eye augmented-reality images via respective left-eye and right-eye displays.

The HMD 1100 may also include various sensors and related systems to provide information to the controller 1104. Such sensors may include, but are not limited to, one or more inward facing image sensors 1108A and 1108B, one or more outward facing image sensors 1110A and 1110B, an inertial measurement unit (IMU) 1114, and one or more microphones 1116. The one or more inward facing image sensors 1108A, 1108B may be configured to acquire image data in the form of gaze tracking data from a wearer's eyes (e.g., sensor 1108A may acquire image data for one of the wearer's eye and sensor 1108B may acquire image data for the other of the wearer's eye).

The controller 1104 of the HMD 1100 may be configured to determine gaze directions of each of a wearer's eyes in any suitable manner based on the information received from the image sensors 1108A, 1108B. For example, one or more light sources 1118A, 1118B, such as infrared light sources, may be configured to cause a glint of light to reflect from the cornea of each eye of a wearer. The one or more image sensors 1108A, 1108B may then be configured to capture an image of the wearer's eyes. Images of the glints and of the pupils as determined from image data gathered from the image sensors 1108A, 1108B may be used by the controller 1104 to determine an optical axis of each eye. Using this information, the controller 1104 may be configured to determine a direction the wearer is gazing (also referred to as a gaze vector). The controller 1104 may be configured to additionally determine an identity of a physical and/or virtual object at which the wearer is gazing by projecting the user's gaze vector onto a 3D model of the surrounding environment. The one or more light sources 1118A, 1118B and the one or more inward facing image sensors 1108a, 1108B may collectively represent to a gaze sensor configured to measure one or more gaze parameters of the user's eyes. In other implementations, a different type of gaze sensor may be employed in the HMD 1100 to measure one or more gaze parameters of the user's eyes. Examples of gaze parameters measured by one or more gaze sensors that may be used by the controller 1104 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes of the wearer of the HMD 1100.

The one or more outward facing image sensors 1110A, 1110B may be configured to measure physical environment attributes of the physical environment in which the HMD

1100 is located (e.g., light intensity). In one example, image sensor 1110A may include a point-of-view camera configured to collect a visible-light image of a physical space. In some implementations, the point-of-view camera may be a visible-light camera. In some implementations, the point-of-view camera may be a color or RGB camera. Further, the image sensor 1110B may include a depth camera configured to collect a depth image of a physical space. More particularly, in one example, the depth camera is an infrared time-of-flight depth camera. In another example, the depth camera is an infrared structured light depth camera.

Data from the outward facing image sensors 1110A, 1110B may be used by the controller 1104 to detect movements within a field of view of the at least partially see-through display 1102, such as gesture-based inputs or other movements performed by a wearer or by a person or physical object within the field of view. In one example, data from the outward facing image sensors 1110A, 1110B may be used to detect a selection input performed by the wearer of the HMD, such as a gesture (e.g., a pinching of fingers, closing of a fist, etc.), that indicates selection of a UI object displayed on the display device. Data from the outward facing image sensors 1110A, 1110B may be used by the controller 1104 to determine direction/location and orientation data (e.g., from imaging environmental features) that enables position/motion tracking of the HMD 1100 in the real-world environment. Data from the outward facing image sensors 1110A, 1110B may be used by the controller 1104 to construct still images and/or video images of the surrounding environment from the perspective of the HMD 1100.

Data from the outward facing image sensors 1110A, 1110B may be used by the controller 1104 to identify surfaces of a physical space. As such, the outward facing image sensors 1110A, 1110B may be referred to as surface sensors configured to measure one or more surface parameters of the physical space.

The controller 1104 may be configured to identify surfaces of the physical space in any suitable manner. In one example, surfaces of the physical space may be identified based on depth maps derived from depth data provide by the depth camera 1110B. In another example, the controller 1104 may be configured to generate or update a three-dimensional model of the physical space using information from outward facing image sensors 1110A, 1110B. Additionally or alternatively, information from outward facing image sensors 1110A, 111B may be communicated to a remote computer responsible for generating and/or updating a model of the physical space. In either case, the relative position and/or orientation of the HMD 1100 relative to the physical space may be assessed so that augmented-reality images may be accurately displayed in desired real-world locations with desired orientations. In one example, the controller 1104 may be configured to perform simultaneous localization and mapping (SLAM) of a physical space using information provided by a surface sensor, alone or in combination with other sensors of the HMD 1100. In particular, the controller 1104 may be configured to generate a 3D model of the physical space including surface reconstruction information that may be used to identify surfaces in the physical space.

In some implementations, the HMD 1100 may include different surface sensors configured to measure one or more surface parameters of the physical space and/or otherwise model the physical space.

The IMU 1114 may be configured to provide position and/or orientation data of the HMD 1100 to the controller 1104. In one implementation, the IMU 1114 may be configured as a three-axis or three-degree of freedom (3DOF) position sensor system. This example position sensor system may, for example, include three gyroscopes to indicate or measure a change in orientation of the HMD 1100 within 3D space about three orthogonal axes (e.g., roll, pitch, and yaw). The orientation derived from the sensor signals of the IMU may be used to display, via the at least partially see-through display, one or more AR images with a realistic and stable position and orientation.

In another example, the IMU 1114 may be configured as a six-axis or six-degree of freedom (6DOF) position sensor system. Such a configuration may include three accelerometers and three gyroscopes to indicate or measure a change in location of the HMD 1100 along three orthogonal spatial axes (e.g., x, y, and z) and a change in device orientation about three orthogonal rotation axes (e.g., yaw, pitch, and roll). In some implementations, position and orientation data from the outward facing image sensors 1110A, 1110B and the IMU 1114 may be used in conjunction to determine a position and orientation (or 6DOF pose) of the HMD 1100.

The HMD 1100 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 1116 may capture sounds of the physical environment surrounding the HMD 1100. For example, the one or more microphones 1116 may capture voice commands spoken by the wearer of the HMD 1100, dialogue of one or more other users in the surrounding environment, and/or other environmental sounds. The one or more microphones 1116 may include any suitable type of microphone (e.g., unidirectional, omnidirectional).

The HMD 1100 may include one or more speakers 1120 to audibly present audio to the wearer of the HMD 1100. The one or more speakers 1120 may include any suitable type of speaker. In one example, the one or more speakers 1120 may audibly present a composite audio stream including a virtual audio layer and a real-world audio layer.

Figure 12:
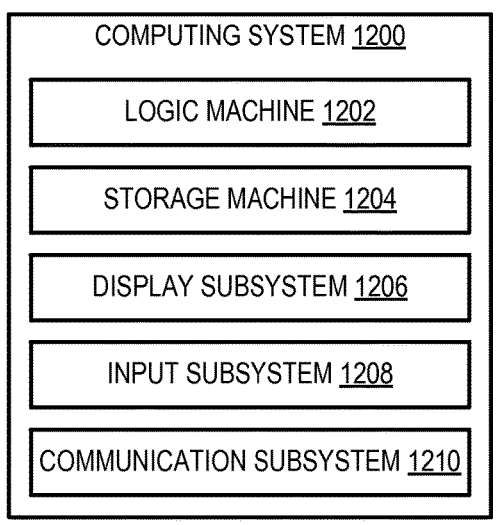
FIG. 12 shows an example computing system.

The controller 1104 may include a logic machine and a storage machine, discussed in more detail above with respect to FIG. 12, in communication with the display and the various sensors of the HMD 1100. In one example, the storage machine may include instructions that are executable by the logic machine to perform various operations related to the methods and processed described herein.

In some implementations, the methods and processes described herein may be tied to a computing system of one or more computing devices. In particular, such methods and processes may be implemented as a computer-application program or service, an application-programming interface (API), a library, and/or other computer-program product.

FIG. 12 schematically shows a non-limiting implementation of a computing system 1200 that can enact one or more of the methods and processes described above. Computing system 1200 is shown in simplified form. Computing system 1200 may take the form of one or more personal computers, server computers, tablet computers, home-entertainment computers, network computing devices, gaming devices, mobile computing devices, mobile communication devices (e.g., smart phone), augmented-reality devices, HMDs, and/or other computing devices. For example, the computing system 1200 may be a non-limiting example of the HMD 104 of FIG. 1, the mobile computing device 202 of FIG. 2, and/or the HMD 1100 of FIG. 11.

Computing system 1200 includes a logic machine 1202 and a storage machine 1204. Computing system 1200 may optionally include a display subsystem 1206, input subsystem 1208, communication subsystem 1210, and/or other components not shown in FIG. 12.

Logic machine 1202 includes one or more physical devices configured to execute instructions. For example, the logic machine 1202 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1202 may include one or more processors configured to execute software instructions. Additionally or alternatively, the logic machine 1202 may include one or more hardware or firmware logic machines configured to execute hardware or firmware instructions. Processors of the logic machine 1202 may be single-core or multi-core, and the instructions executed thereon may be configured for sequential, parallel, and/or distributed processing. Individual components of the logic machine 1202 optionally may be distributed among two or more separate devices, which may be remotely located and/or configured for coordinated processing. Aspects of the logic machine 1202 may be virtualized and executed by remotely accessible, networked computing devices configured in a cloud-computing configuration.

Storage machine 1204 includes one or more physical devices configured to hold instructions executable by the logic machine 1202 to implement the methods and processes described herein. When such methods and processes are implemented, the state of storage machine 1204 may be transformed—e.g., to hold different data.

Storage machine 1204 may include removable and/or built-in devices. Storage machine 1204 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1204 may include volatile, nonvolatile, dynamic, static, read/write, read-only, random-access, sequential-access, location-addressable, file-addressable, and/or content-addressable devices.

It will be appreciated that storage machine 1204 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1202 and storage machine 1204 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1206 may be used to present a visual representation of data held by storage machine 1204. This visual representation may take the form of a graphical user interface (GUI). As the herein described methods and processes change the data held by the storage machine, and thus transform the state of the storage machine, the state of display subsystem 1206 may likewise be transformed to visually represent changes in the underlying data. Display subsystem 1206 may include one or more display devices utilizing virtually any type of technology. Such display devices may be combined with logic machine 1202 and/or storage machine 1204 in a shared enclosure, or such display devices may be peripheral display devices.

When included, input subsystem 1208 may comprise or interface with one or more user-input devices such as a keyboard, mouse, touch screen, or game controller. In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1210 may be configured to communicatively couple computing system 1200 with one or more other computing devices. Communication subsystem 1210 may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 1200 to send and/or receive messages to and/or from other devices via a network such as the Internet.

In another example implementation, on an augmented-reality device, a method of providing a mixed-reality experience comprises rendering from a three-dimensional model a two-dimensional augmentation image from a first virtual perspective, outputting the augmentation image, applying a transformation to the augmentation image to yield an updated two-dimensional augmentation image that approximates a second virtual perspective of the three-dimensional model without additional rendering from the three-dimensional model, and outputting the updated augmentation image. In one example implementation that optionally may be combined with any of the features described herein, outputting the updated augmentation image includes outputting the updated augmentation image as a layer of a mixed-reality recording. The mixed-reality recording may include a second layer including a visible-light image captured by a point-of-view camera. In one example implementation that optionally may be combined with any of the features described herein, the transformation is selected so that the updated two-dimensional augmentation image has a virtual perspective simulating a real-world perspective of the point-of-view camera when the visible-light image is captured. In one example implementation that optionally may be combined with any of the features described herein, the method further comprises cropping a larger of the updated augmentation image and the visible-light image to match a smaller of the updated augmentation image and the visible light image in the mixed-reality recording. In one example implementation that optionally may be combined with any of the features described herein, outputting the updated augmentation image includes outputting the updated augmentation image to a display of the augmented-reality device for visual presentation of the augmentation image by the display. In one example implementation that optionally may be combined with any of the features described herein, the display is an at least partially see-through display, and the updated augmentation image is visually presented on the at least partially see-through display while light from a physical space passes through the at least partially see-through display to a user eye. In one example implementation that optionally may be combined with any of the features described herein, the updated augmentation image has dimensions that are larger than dimensions of a field of view of the display, and the method further comprises, cropping the updated augmentation image. In one example implementation that optionally may be combined with any of the features described herein, applying a transformation to the augmentation image includes, for each pixel of the augmentation image, passing a screen coordinate of the pixel through an inverse view-projection matrix to yield a virtual position in a three-dimensional transformation model from the first virtual perspective, for each virtual position of the three-dimensional transformation model, mapping the virtual position to an updated virtual position in an updated three-dimensional transformation model to simulate the second virtual perspective, and for each updated virtual position in the updated three-dimensional transformation model, passing the updated virtual position of the pixel through a view-projection matrix to yield an updated screen coordinate of the pixel. In one example implementation that optionally may be combined with any of the features described herein, the method further comprises if two or more updated virtual positions map to a same pixel, selecting an updated virtual position nearest to the second virtual perspective as the updated virtual position of the same pixel.

In another example implementation, an augmented-reality device, comprises an at least partially see-through display, a logic machine, and a storage machine holding instructions executable by the logic machine t, render from a three-dimensional model a two-dimensional augmentation image from a first virtual perspective, output the augmentation image, applying a transformation to the augmentation image to yield an updated two-dimensional augmentation image that approximates a second virtual perspective of the three-dimensional model without additional rendering from the three-dimensional model, and output the updated augmentation image. In one example implementation that optionally may be combined with any of the features described herein, outputting the updated augmentation image includes outputting the updated augmentation image as a layer of a mixed-reality recording. The mixed-reality recording may include a second layer including a visible-light image captured by a point-of-view camera. In one example implementation that optionally may be combined with any of the features described herein, the transformation is selected so that the updated two-dimensional augmentation image has a virtual perspective simulating a real-world perspective of the point-of-view camera when the visible-light image is captured. In one example implementation that optionally may be combined with any of the features described herein, the storage machine further holds instructions executable by the logic machine to, crop a larger of the updated augmentation image and the visible-light image to match a smaller of the updated augmentation image and the visible light image in the mixed-reality recording. In one example implementation that optionally may be combined with any of the features described herein, outputting the updated augmentation image includes outputting the updated augmentation image to the at least partially see-through display, and the updated augmentation image is visually presented on the at least partially see-through display while light from a physical space passes through the at least partially see-through display to a user eye. In one example implementation that optionally may be combined with any of the features described herein, the updated augmentation image has dimensions that are larger than dimensions of a field of view of the display, and wherein the storage machine further holds instructions executable by the logic machine to, crop the updated augmentation image. In one example implementation that optionally may be combined with any of the features described herein, applying a transformation to the augmentation image includes, for each pixel of the augmentation image, pass a screen coordinate of the pixel through an inverse view-projection matrix to yield a virtual position in a three-dimensional transformation model from the first virtual perspective, for each virtual position of the three-dimensional transformation model, map the virtual position to an updated virtual position in an updated three-dimensional transformation model to simulate the second virtual perspective, and for each updated virtual position in the updated three-dimensional transformation model, pass the updated virtual position of the pixel through a view-projection matrix to yield an updated screen coordinate of the pixel. In one example implementation that optionally may be combined with any of the features described herein, the storage machine further holds instructions executable by the logic machine to, if two or more updated virtual positions map to a same pixel, select an updated virtual position nearest to the second virtual perspective as the updated virtual position of the same pixel.

In another example implementation, on an augmented-reality device, a method of providing a mixed-reality experience, the method comprising, rendering from a three-dimensional model a two-dimensional augmentation image from a first virtual perspective corresponding to a real-world perspective of an at least partially see-through display of the augmented reality device, outputting the augmentation image to the at least partially see-through display, obtaining, via a point-of-view camera of the augmented-reality device, a visible-light image of a physical space, applying a transformation to the two-dimensional augmentation image to yield an updated two-dimensional augmentation image that approximates a second virtual perspective corresponding to a real-world perspective of the point-of-view camera when the visible-light image is captured, and combining the updated two-dimensional augmentation image and the visible light image in a mixed reality recording. In one example implementation that optionally may be combined with any of the features described herein, applying a transformation to the augmentation image includes, for each pixel of the augmentation image, passing a screen coordinate of the pixel through an inverse view-projection matrix to yield a virtual position in a three-dimensional transformation model from the first virtual perspective, for each virtual position of the three-dimensional transformation model, mapping the virtual position to an updated virtual position in an updated three-dimensional transformation model to simulate the second virtual perspective, and for each updated virtual position in the updated three-dimensional transformation model, passing the updated virtual position of the pixel through a view-projection matrix to yield an updated screen coordinate of the pixel. In one example implementation that optionally may be combined with any of the features described herein, the method further comprises, if two or more updated virtual positions map to a same pixel, selecting an updated virtual position nearest to the second virtual perspective as the updated virtual position of the same pixel.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On an augmented-reality device, a method of providing a mixed-reality experience, the method comprising:
   rendering from a three-dimensional model a two-dimensional augmentation image, the two-dimensional augmentation image providing a view of the three-dimensional model from a first virtual perspective of a virtual camera spatially registered to a first real-world location;
   outputting the two-dimensional augmentation image;
   applying a transformation to the two-dimensional augmentation image to yield an updated two-dimensional augmentation image, the updated two-dimensional augmentation image approximating a different view of the three-dimensional model from a second virtual perspective of the virtual camera spatially registered to a second real-world location different than the first real-world location such that the second virtual perspective is different than the first virtual perspective; and
   outputting the updated two-dimensional augmentation image.

2. The method of claim 1, wherein outputting the updated two-dimensional augmentation image includes outputting the updated two-dimensional augmentation image as a layer of a mixed-reality recording, the mixed-reality recording including a second layer including a visible-light image captured by a point-of-view camera.

3. The method of claim 2, wherein the transformation is selected so that the updated two-dimensional augmentation image has a virtual perspective simulating a real-world perspective of the point-of-view camera at the second real-world location when the visible-light image is captured.

4. The method of claim 2, further comprising:
   cropping a larger of the updated two-dimensional augmentation image and the visible-light image to match a smaller of the updated two-dimensional augmentation image and the visible light image in the mixed-reality recording.

5. The method of claim 1, wherein outputting the updated two-dimensional augmentation image includes outputting the updated two-dimensional augmentation image to a display of the augmented-reality device for visual presentation of the updated two-dimensional augmentation image by the display.

6. The method of claim 5, wherein the display is an at least partially see-through display, wherein the updated two-dimensional augmentation image is visually presented on the at least partially see-through display while light from a physical space passes through the at least partially see-through display to a user eye.

7. The method of claim 5, wherein the updated two-dimensional augmentation image has dimensions that are larger than dimensions of a field of view of the display, and the method further comprises, cropping the updated two-dimensional augmentation image.

8. The method of claim 1, wherein applying a transformation to the augmentation image includes,
   for each pixel of the augmentation image, passing a screen coordinate of the pixel through an inverse view-projection matrix to yield a virtual position in a three-dimensional transformation model from the first virtual perspective,
   for each virtual position of the three-dimensional transformation model, mapping the virtual position to an updated virtual position in an updated three-dimensional transformation model to simulate the second virtual perspective, and
   for each updated virtual position in the updated three-dimensional transformation model, passing the updated virtual position of the pixel through a view-projection matrix to yield an updated screen coordinate of the pixel.

9. The method of claim 8, wherein the method further comprises:
   if two or more updated virtual positions map to a same pixel, selecting an updated virtual position nearest to the second virtual perspective as the updated virtual position of the same pixel.

10. An augmented-reality device, comprising:
    an at least partially see-through display;
    a logic machine; and
    a storage machine holding instructions executable by the logic machine to:
       render from a three-dimensional model a two-dimensional augmentation image, the two-dimensional augmentation image providing a view of the three-dimensional model from a first virtual perspective of a virtual camera spatially registered to a first real-world location;
       output the two-dimensional augmentation image;
       applying a transformation to the two-dimensional augmentation image to yield an updated two-dimensional augmentation image, the updated two-dimensional augmentation image approximating a different view of the three-dimensional model from a second virtual perspective of the virtual camera spatially registered to a second real-world location different than the first real-world location such that the second virtual perspective is different than the first virtual perspective; and
       output the updated two-dimensional augmentation image.

11. The augmented-reality device of claim 10, wherein outputting the updated two-dimensional augmentation image includes outputting the updated two-dimensional augmentation image as a layer of a mixed-reality recording, the mixed-reality recording including a second layer including a visible-light image captured by a point-of-view camera.

12. The augmented-reality device of claim 11, wherein the transformation is selected so that the updated two-dimensional augmentation image has a virtual perspective simulating a real-world perspective of the point-of-view camera at the second real-world location when the visible-light image is captured.

13. The augmented-reality device of claim 11, wherein the storage machine further holds instructions executable by the logic machine to:
   crop a larger of the updated two-dimensional augmentation image and the visible-light image to match a smaller of the updated two-dimensional augmentation image and the visible light image in the mixed-reality recording.

14. The augmented-reality device of claim 10, wherein outputting the updated two-dimensional augmentation image includes outputting the updated two-dimensional augmentation image to the at least partially see-through display, and wherein the updated two-dimensional augmentation image is visually presented on the at least partially see-through display while light from a physical space passes through the at least partially see-through display to a user eye.

15. The augmented-reality device of claim 14, wherein the updated two-dimensional augmentation image has dimensions that are larger than dimensions of a field of view of the display, and wherein the storage machine further holds instructions executable by the logic machine to:
   crop the updated two-dimensional augmentation image.

16. The augmented-reality device of claim 10, wherein applying a transformation to the augmentation image includes,
   for each pixel of the augmentation image, pass a screen coordinate of the pixel through an inverse view-projection matrix to yield a virtual position in a three-dimensional transformation model from the first virtual perspective,
   for each virtual position of the three-dimensional transformation model, map the virtual position to an updated virtual position in an updated three-dimensional transformation model to simulate the second virtual perspective, and
   for each updated virtual position in the updated three-dimensional transformation model, pass the updated virtual position of the pixel through a view-projection matrix to yield an updated screen coordinate of the pixel.

17. The augmented-reality device of claim 16, wherein the storage machine further holds instructions executable by the logic machine to:
   if two or more updated virtual positions map to a same pixel, select an updated virtual position nearest to the second virtual perspective as the updated virtual position of the same pixel.

18. On an augmented-reality device, a method of providing a mixed-reality experience, the method comprising:
   rendering from a three-dimensional model a two-dimensional augmentation image, the two-dimensional augmentation image providing a view of the three-dimensional model from a first virtual perspective of a virtual camera spatially registered to a real-world perspective of an at least partially see-through display of the augmented reality device;
   outputting the two-dimensional augmentation image to the at least partially see-through display;
   obtaining, via a point-of-view camera of the augmented-reality device, a visible-light image of a physical space;
   applying a transformation to the two-dimensional augmentation image to yield an updated two-dimensional augmentation image, the updated two-dimensional augmentation image approximating a different view of the three-dimensional model from a second virtual perspective different than the first virtual perspective of the virtual camera and corresponding to a real-world perspective of the point-of-view camera when the visible-light image is captured, wherein applying the transformation to the augmentation image includes,
      for each pixel of the augmentation image, passing a screen coordinate of the pixel through an inverse view-projection matrix to yield a virtual position in a three-dimensional transformation model from the first virtual perspective,
      for each virtual position of the three-dimensional transformation model, mapping the virtual position to an updated virtual position in an updated three-dimensional transformation model to simulate the second virtual perspective, and
      for each updated virtual position in the updated three-dimensional transformation model, passing the updated virtual position of the pixel through a view-projection matrix to yield an updated screen coordinate of the pixel;
   combining the updated two-dimensional augmentation image and the visible light image in a mixed reality recording; and
   outputting the mixed reality recording.

19. The method of claim 18, wherein the method further comprises:
   if two or more updated virtual positions map to a same pixel, selecting an updated virtual position nearest to the second virtual perspective as the updated virtual position of the same pixel.

* * * * *